(12) United States Patent
Bassett et al.

(10) Patent No.: US 10,585,243 B2
(45) Date of Patent: Mar. 10, 2020

(54) HIGH REFRACTIVE INDEX WAVEGUIDES AND METHOD OF FABRICATION

(71) Applicant: THE TRUSTEES OF THE UNIVERSITY OF PENNSYLVANIA, Philadelphia, PA (US)

(72) Inventors: Lee Bassett, Philadelphia, PA (US); Richard Grote, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 15/777,975

(22) PCT Filed: Dec. 2, 2016

(86) PCT No.: PCT/US2016/064650
§ 371 (c)(1),
(2) Date: May 22, 2018

(87) PCT Pub. No.: WO2017/096183
PCT Pub. Date: Jun. 8, 2017

(65) Prior Publication Data
US 2018/0348431 A1    Dec. 6, 2018

Related U.S. Application Data

(60) Provisional application No. 62/261,943, filed on Dec. 2, 2015.

(51) Int. Cl.
| | | |
|---|---|---|
| G02B 6/132 | (2006.01) | |
| G02B 6/122 | (2006.01) | |
| G02B 6/136 | (2006.01) | |
| G02B 6/12  | (2006.01) | |

(52) U.S. Cl.
CPC .......... *G02B 6/136* (2013.01); *G02B 6/12004* (2013.01); *G02B 6/1223* (2013.01); *G02B 6/132* (2013.01); *G02B 2006/12035* (2013.01); *G02B 2006/12038* (2013.01);
(Continued)

(58) Field of Classification Search
CPC ............................................ G02B 2006/12097
See application file for complete search history.

(56) References Cited

U.S. PATENT DOCUMENTS

| | | |
|---|---|---|
| 6,169,825 B1 | 1/2001 | Morey et al. |
| 7,454,112 B2 | 11/2008 | Chen et al. |
| 2001/0055453 A1 | 12/2001 | Mizuuchi et al. |

(Continued)

OTHER PUBLICATIONS

International Search Report issued in PCT/US2016/064650 dated Apr. 7, 2017, 4 pages.
(Continued)

*Primary Examiner* — Omar R Rojas
(74) *Attorney, Agent, or Firm* — Jenkins, Wilson, Taylor & Hunt, P.A.

(57) ABSTRACT

Optical component and methods for forming optical components are described. The optical component includes a substrate having a base and a fin extending from the base, a buffer layer formed on the substrate leaving a portion of the fin exposed, and a confinement layer deposited over the buffer layer and the fin. The refractive index of the substrate is greater than the refractive index of the confinement layer, and the refractive index of the confinement layer is greater than the refractive index of the buffer layer.

6 Claims, 14 Drawing Sheets

(52) U.S. Cl.
CPC .............. *G02B 2006/12088* (2013.01); *G02B 2006/12097* (2013.01); *G02B 2006/12173* (2013.01)

(56) References Cited

U.S. PATENT DOCUMENTS

| | | | |
|---|---|---|---|
| 2005/0123244 A1 | 6/2005 | Block et al. | |
| 2010/0110679 A1 | 5/2010 | Teng et al. | |
| 2012/0328234 A1 | 12/2012 | Lu et al. | |
| 2016/0306111 A1* | 10/2016 | Lambert | .............. H05K 999/99 |

OTHER PUBLICATIONS

Written Opinion of the International Searching Authority issued in PCT/US2016/064650 dated Apr. 7, 2017, 5 pages.
Cardenas et al., "Optical nonlinearities in high-confinement silicon carbide waveguides," Optics Letters, vol. 40, No. 17, pp. 4138-4141 (Sep. 2015).
Latawiec et al., "On-chip diamond Raman laser," Optica, vol. 2, No. 11, pp. 924-928 (Nov. 2015).
Mouradian et al., "Scalable Integration of Long-Lived Quantum Memories into a Photonic Circuit," Physical Review X, vol. 5, No. 3, pp. 031009:1-031009:8 (Jul. 2015).
Gao et al., "Coherent manipulation, measurement and entanglement of individual solid-state spins using optical fields," Nature Photonics, vol. 9, pp. 363-373 (May 2015).
Rumley et al., "Silicon Photonics for Exascale Systems," IEEE Journal or Lightwave Technology, vol. 33, No. 3, pp. 547-562 (Feb. 2015).
Sun et al., "A Monolithically-Integrated Chip-to-Chip Optical Link in Bulk CMOS," IEEE Journal of Solid-State Circuits, vol. 50, No. 4, pp. 828-844 (Apr. 2015).
Burek et al., "High quality-factor optical nanocavities in bulk single-crystal diamond," Nature Communications, vol. 5, Article 5718, pp. 1-7 (Dec. 2014).
Kimerling et al., "Scaling computation with silicon photonics," MRS Bulletin, vol. 39, No. 8, pp. 687-695 (Aug. 2014).
Smit et al., "An introduction to InP-based generic integrationtechnology," Semiconductor Science and Technology, vol. 29, No. 8, pp. 083001:1-083001:41 (Jun. 2014).
Hausmann et al., "Diamond nonlinear photonics," Nature Photonics, vol. 8, pp. 369-374 (Apr. 2014).
Thomas et al., "Waveguide-integrated single-crystalline GaP resonators on diamond," Optics Express, vol. 22, No. 11, pp. 13555-13564 (Apr. 2014).
Moss et al., "New CMOS-compatible platforms based on silicon nitride and Hydex for nonlinear optics," Nature Photonics, vol. 7, pp. 597-607 (Jul. 2013).
Bernien et al., "Heralded entanglement between solid-state qubits separated by three meters," Nature, vol. 497, pp. 86-90 (Apr. 2013).
Awschalom et al., "Quantum Spintronics: Engineering and Manipulating Atom-Like Spins in Semiconductors," Science, vol. 339, No. 6124, pp. 1174-1179 (Mar. 2013).
Lin et al., "Air-clad silicon pedestal structures for broadband mid-infrared microphotonics," Optics Letters, vol. 38, No. 7, pp. 1031-1033 (2013).
Choi et al., "Fabrication of SiC nanopillars by inductively coupled $SF_6/O_2$ plasma etching," Journal of Physics D: Applied Physics, vol. 45, pp. 1-9 (May 2012).
Aharonovich et al., "Diamond photonics," Nature Photonics, vol. 5, pp. 397-405 (Jun. 2011).
Faraon et al., "Resonant enhancement of the zero-phonon emission from a color center in a diamond cavity," Nature Photonics, vol. 5, pp. 301-305 (Apr. 2011).
Castelletto et al., "Diamond-based structures to collect and guide light," New Journal of Physics, vol. 13, pp. 025020:1-025020:24 (Feb. 2011).
Eggleton et al., "Chalcogenide photonics," Nature Photonics, vol. 5, pp. 141-148 (Feb. 2011).
Coldren et al., "High Performance InP-Based Photonic ICs—A Tutorial," IEEE Journal of Lightwave Technology, vol. 29, No. 4, pp. 554-570 (Jan. 2011).
Orcutt et al., "Nanophotonic integration in state-of-the-art CMOS foundries," Optics Express, vol. 19, No. 3, pp. 2335-2346 (Jan. 2011).
Wu et al., "High Performance 22/20nm FinFET CMOS Devices with Advanced High-K/Metal Gate Scheme," IEEE International Electron Devices Meeting (IEDM), pp. 27.1.1-27.1.4 (Dec. 2010).
Wu et al., "High aspect ratio silicon etch: A review," Journal of Applied Physics, vol. 108, No. 5, pp. 051101:1-051101:20 (Sep. 2010).
Halldorsson et al., "High index contrast polymer waveguide platform for integrated biophotonics," Optics Express, vol. 18, No. 15, pp. 16217-16226 (Jul. 2010).
Hausmann et al., "Fabrication of Diamond Nanowires for Quantum Information Processing Applications," Diamond and Related Materials, vol. 19, No. 5-6, pp. 621-629 (May-Jun. 2010).
Weber et al., "Quantum computing with defects," Proceedings of the National Academy of Sciences (PNAS), vol. 107, No. 19, pp. 8513-8518 (May 2010).
Buckley et al., "Spin-Light Coherence for Single-Spin Measurement and Control in Diamond," Science, vol. 330, No. 6008, pp. 1212-1215 (2010).
Loh et al., "A fundamental relation between phase and group velocity, and application to the failure of perfectly matched layers in backward-wave structures," Physical Review E, vol. 79, No. 6 (Pt. 2), pp. 065601:1-065601:5 (Jul. 2009).
Driscoll et al., "Large longitudinal electric fields (Ez) in silicon nanowire waveguides," Optics Express, vol. 17, No. 4, pp. 2797-2804 (Mar. 2009).
Fallahkhair et al., "Vector Finite Difference Modesolver for Anisotropic Dielectric Waveguides," IEEE Journal of Lightwave Technology, vol. 26, No. 11, pp. 1423-1431 (Jun. 2008).
Liu et al., "High-speed optical modulation based on carrier depletion in a silicon waveguide," Optics Express, vol. 15, No. 2, pp. 660-668 (Feb. 2007).
Grillot et al., "Propagation Loss in Single-Mode Ultrasmall Square Silicon-on-Insulator Optical Waveguides," IEEE Journal of Lightwave Technology, vol. 24, No. 2, pp. 891-896 (Mar. 2006).
Park et al., "InGaAsP—InP Nanoscale Waveguide-Coupled Microring Lasers With Submilliampere Threshold Current Using $Cl_2$—$N_2$-Based High-Density Plasma Etching," IEEE Journal of Quantum Electronics, vol. 41, No. 3, pp. 351-356 (Mar. 2005).
Song et al., "Ultra-high-Q photonic double-heterostructure nanocavity," Nature Materials, vol. 4, pp. 207-210 (Feb. 2005).
Knight et al., "Properties of photonic crystal fiber and the effective index model," Journal of the Optical Society of America A, vol. 15, No. 3, pp. 748-752 (1998).
Lui et al., "Full-Vectorial Wave Propagation in Semiconductor Optical Bending Waveguides and Equivalent Straight Waveguide Approximations," IEEE Journal of Lightwave Technology, vol. 16, No. 5, pp. 910-914 (1998).
Payne et al., "A theoretical analysis of scattering loss from planar optical waveguides," Optical and Quantum Electronics, vol. 26, No. 10, pp. 977-986 (Oct. 1994).
Bååk, "Silicon oxynitride; a material for GRIN optics," Applied Optics, vol. 21, No. 6, pp. 1069-1072 (1982).
Shaffer, "Refractive Index, Dispersion, and Birefringence of Silicon Carbide Polytypes," Applied Optics, vol. 10, No. 5, pp. 1034-1036 (1971).

* cited by examiner

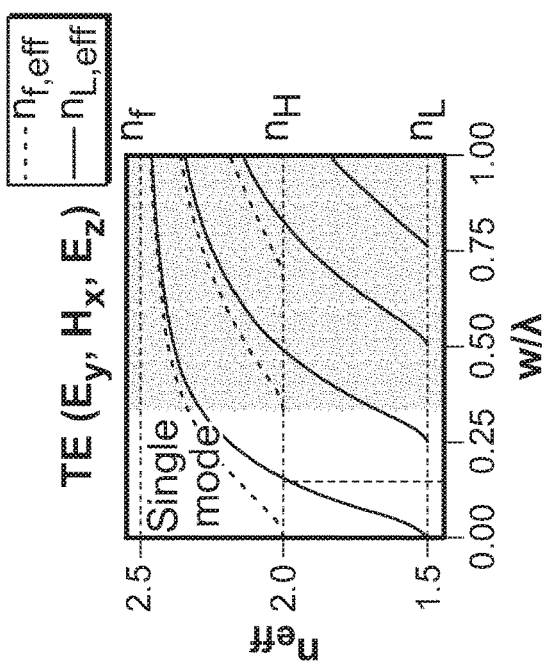
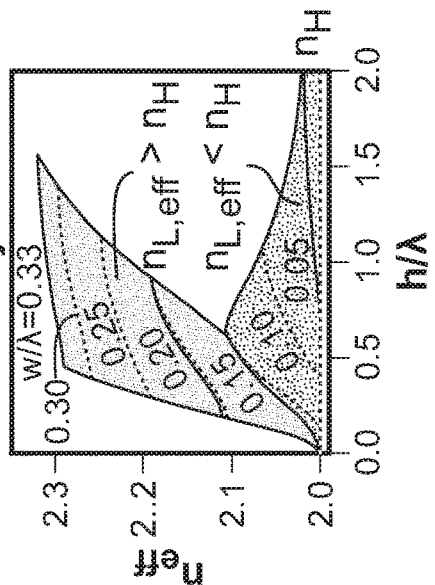
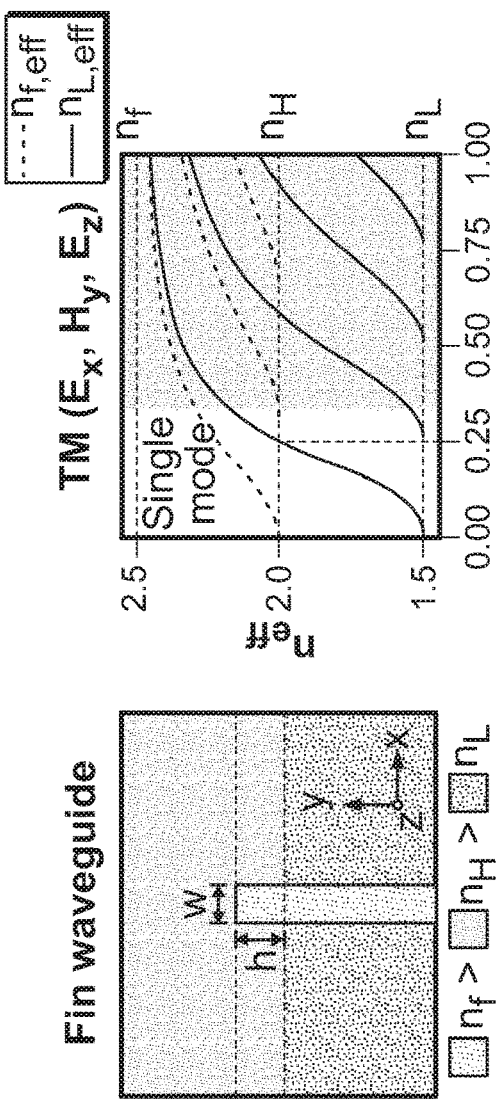
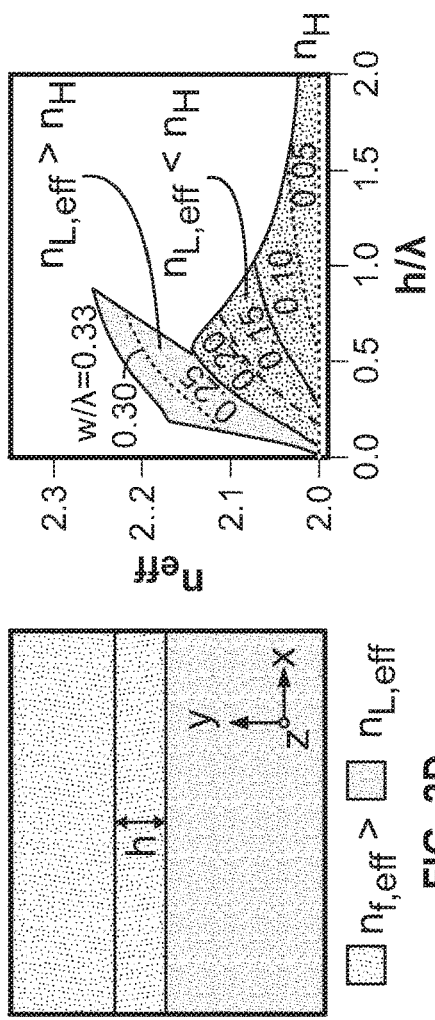
FIG. 2A Fin waveguide
FIG. 2B TM ($E_x$, $H_y$, $E_z$)
FIG. 2C TE ($E_y$, $H_x$, $E_z$)
FIG. 2D Slab waveguide approximation
FIG. 2E Quasi-TE ($E_x$ dominant)
FIG. 2F Quasi-TM ($E_y$ dominant)

HIGH REFRACTIVE INDEX WAVEGUIDES AND METHOD OF FABRICATION

CROSS REFERENCE TO RELATED APPLICATIONS

This application is the U.S. National Phase application of PCT/US2016/064650, filed Dec. 2, 2016, which claims priority from U.S. Provisional Patent Application Ser. No. 62/261,943, filed Dec. 2, 2015, incorporated herein by reference in their entirety.

This application relates, in general, to a waveguide and a method for fabricating the waveguide. The waveguide includes a high refractive index material surrounded by a low index material, and an additional intermediate index cladding on the waveguide.

BACKGROUND

Photonic devices are used today in fiber optic communications and Photonic Integrated Circuits (PICs) are an active research area to transmit information with light rather than electricity. Using PICs on computer chips provides faster data transmission rates, lower power consumption, and less energy wasted through thermal dissipation. PICs are used commercially for the telecom backbone, and are increasingly finding use in active optical cables for rack-to-rack communication in server farms.

Conventionally, PICs require a substrate hetero-structure including a low-refractive-index buried layer to achieve optical confinement, such as the buried oxide layer used for silicon-on-insulator PICs or the AlGaAs layer used for molecular-beam-epitaxy-grown III-V PICs. Diamond is a promising material for PICs due to its optical properties. Fabrication difficulties associated with diamond, however, have impeded progress in this area.

SUMMARY

To meet this and other needs, and in view of its purposes, optical components and methods for forming optical components are described. The optical component includes a substrate having a base and a fin extending from the base, a buffer layer formed on the substrate leaving a portion of the fin exposed, and a confinement layer deposited over the buffer layer and the fin. The refractive index of the substrate is greater than the refractive index of the confinement layer, and the refractive index of the confinement layer is greater than the refractive index of the buffer layer.

A method for fabricating the optical component includes performing lithography to produce a hard mask on a substrate, performing hard etching to transfer the hard mask onto the substrate to create a fin, performing an isotropic low index growth on the etched substrate to cover the fin with a low index material, performing an anisotropic low index growth on the isotropic low index growth to further cover the fin with the low index material, performing a planarization process on the isotropic low index growth and the anisotropic low index growth to expose a portion of the fin, performing a high index growth to cover the exposed portion of the fin with a layer of high index material, and performing laser cutting on the optical component to expose a portion of the diamond substrate for optical coupling.

It is understood that the foregoing general description and the following detailed description is exemplary, but not restrictive.

BRIEF DESCRIPTION OF THE DRAWINGS

The invention is best understood from the following detailed description when read in connection with the accompanying drawings, with like elements having the same reference numerals. This emphasizes that according to common practice, the various features of the drawings are not drawn to scale. On the contrary, the dimensions of the various features are arbitrarily expanded or reduced for clarity. Included in the drawings are the following figures:

FIG. 2a is a cross-section view of proposed waveguide geometry, according to an example embodiment.

FIG. 2b is a dispersion of the y-invariant slab waveguides for TM polarizations, according to an example embodiment.

FIG. 2c is a dispersion of the y-invariant slab waveguides for TE polarizations, according to an example embodiment.

FIG. 2d is an effective index model, according to an example embodiment.

FIG. 2e is a dispersion for the 2D confined fin-waveguide modes for quasi-TE (Ex-dominant) polarizations, where lines represent effective-index method calculated modes with increasing $w/\lambda$, points represent finite-difference-method calculations, and the bounding black curves correspond to Eqns. 5 and 6, according to an example embodiment.

FIG. 2f is a dispersion for the 2D confined fin-waveguide modes for quasi-TM (Ey-dominant) polarizations, where lines represent effective-index method calculated modes with increasing $w/\lambda$, points represent finite-difference-method calculations, and the bounding black curves correspond to Eqns. 5 and 6, according to an example embodiment.

DETAILED DESCRIPTION

As described below, the example embodiments provide a single-mode waveguide geometry for guiding and confining light in a high-refractive index material on a native substrate. The geometry includes a high-aspect-ratio fin of the guiding material surrounded by lower refractive index dielectrics, which allows for top-down fabrication of photonic integrated circuits on high-refractive index substrates without the need for a buffer layer.

To illustrate this concept, the waveguide geometry is modeled using an effective index method and the results are compared with a fully vectorial numerical mode solver. Device designs are then given for two candidate systems (e.g., diamond at λ=637 nm and silicon at λ=1.55 μm). This waveguide design allows for optical integrated circuit fabrication on emerging high index materials, and can potentially remove the need for a buried oxide layer in silicon photonics.

Figure 1:
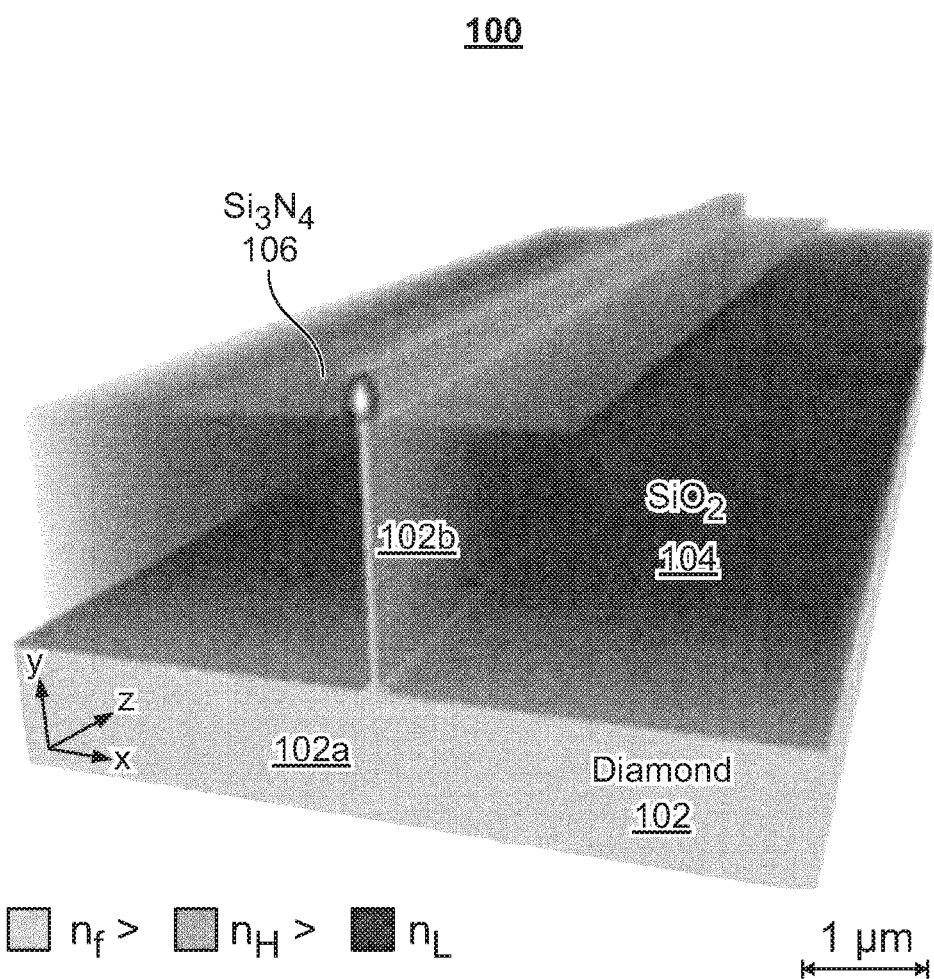
FIG. 1 is a view of an optical fin waveguide on a diamond substrate at $\lambda=637$ nm designed to support a single mode at the design wavelength, according to an example embodiment.

FIG. 1 depicts an optical fin waveguide. The illustrated optical fin waveguide includes a diamond substrate 102. The diamond substrate 102 includes a base 102a and a fin 102b that extends from the base 102a. In the illustrated embodiment, the fin 102b extends perpendicular to the x-z plane of the base 102a. A first material 104 is formed over the diamond substrate 102 such that a portion of the fin 102b extends beyond a top surface of the first material. In the illustrated embodiment, the first material is SiO$_2$. A second material 106 is formed over the first material 104. In the illustrated embodiment, the second material 106 is Si$_3$N$_4$. For the illustrated optical fin waveguide, a diamond waveguide at λ=637 nm is designed to support a single mode at that wavelength. Although a diamond substrate optical fin waveguide is illustrated, other suitable waveguide materials, such as Si, and their architecture will be understood from the description herein. Additionally, although the first material 104 is illustrated as SiO$_2$ and the second material 106 is illustrated as Si$_3$N$_4$, other materials where the base/fin has the highest index, the first material 104 (buffer layer) has the lowest index, and the second material 106 (confinement layer) has an intermediate index.

High-performance photonic integrated circuits in both Si and InP-based platforms are playing an increasingly important role in data applications. Similarly, diamond and other wideband gap semiconductors (such as SiC and GaP) have emerged as candidate materials for integrated quantum communications applications due to the presence of color centers with desirable quantum properties. Common to both of these areas is a need for low-propagation-loss single-mode waveguides that can be fabricated on a high-refractive-index substrates in a scalable fashion. The high-refractive index of these materials allows for tight optical confinement, small on-chip bend radii, and strong light-matter interaction. Power leakage from the waveguide may be minimized through the use of a lower refractive index support substrate and/or under-cutting.

A new type of waveguide was developed that is optimized for high-index substrates that utilizes top-down lithography and deposited dielectric layers to create confinement in the high-index material. An example of a SiO$_2$/Si$_3$N$_4$ stack on a diamond substrate at λ=637 nm is shown in FIG. 1.

Though both deposited dielectric layers have a lower index than the substrate, the proposed design achieves confinement by engineering the effective index, resulting in an optical mode confined within the high-index material (diamond in the case of FIG. 1). The supported waveguide mode can propagate without leaking power into the underlying diamond substrate. These highly confined single-mode waveguides can be fabricated on a native high refractive index substrate, obviating the need for thin membranes, free-standing structures, and wafer bonding. As such, the proposed architecture provides a pathway towards large area, scalable PICs with applications ranging from silicon photonics to quantum information science.

Figure 13:
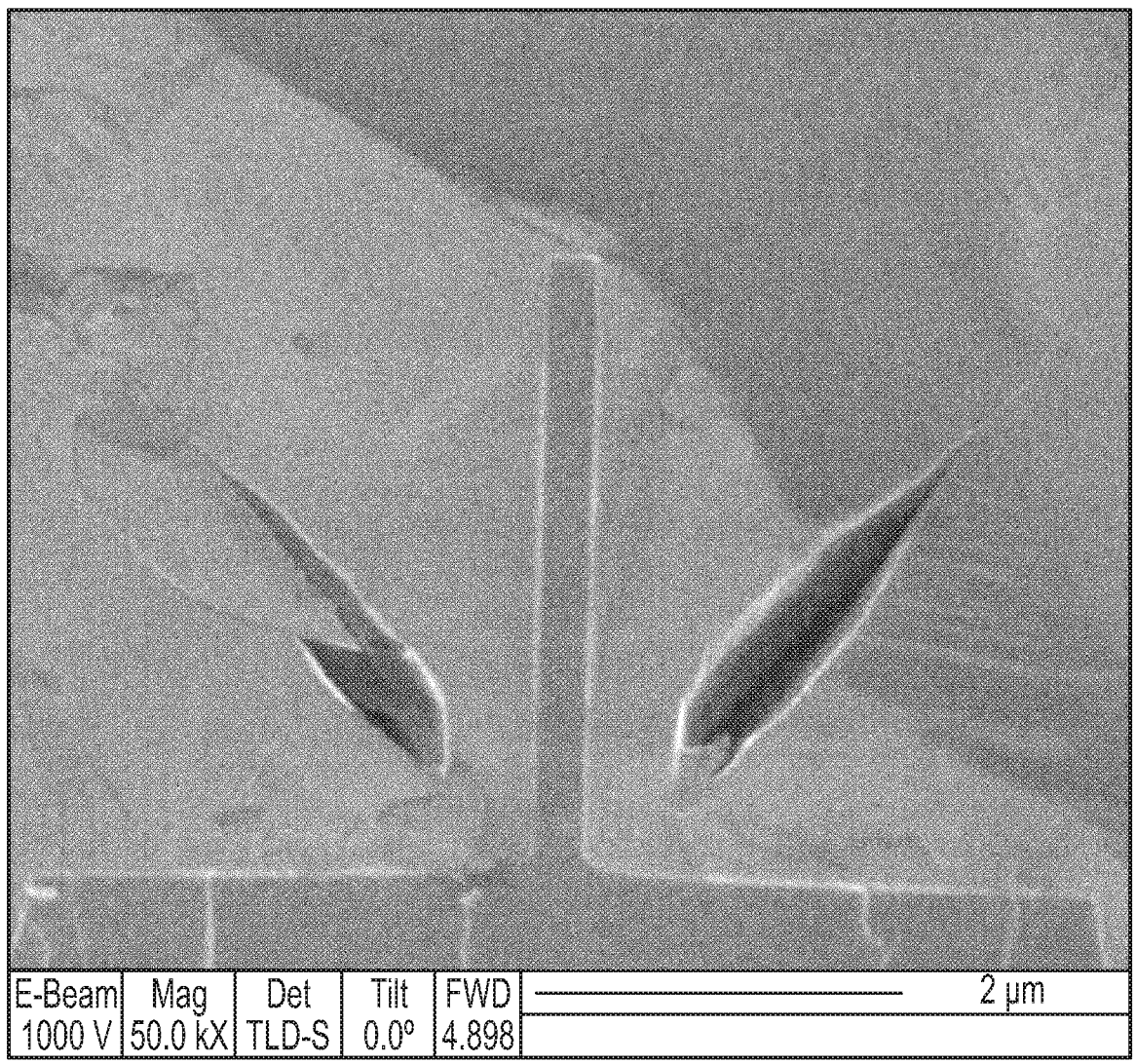
FIG. 13 shows a cross section view of a silicon fin waveguide encapsulated in SiO2, according to an example embodiment.

An example of a fabricated silicon waveguide viewed under magnification is shown in FIG. 13. Specifically, FIG. 13 shows a cross section 1300 of a silicon fin waveguide encapsulated in SiO2. The fin can be seen in the center of the figure extending from the substrate at the bottom of the figure.

The physical mechanism for the optical confinement displayed in FIG. 1 can be understood by an effective index model, which provides an approximate solution to the modal eigenvalue problem. Begin by considering the two dimensional cross-section of the z-invariant waveguide dielectric topology with a high index substrate and guiding region, n$_f$, a lower index buffer layer, n$_L$, and an intermediate-index confinement layer, n$_H$ as shown in FIG. 2a. The first step in calculating the effective index is to split the dielectric topology into homogeneous regions along the vertical y-direction, indicated by the dashed black lines. The top slice is also homogeneous in the horizontal x-direction, while the middle and bottom slices can be treated as symmetric slab waveguides with one dimensional confinement in the x-direction. The two slab waveguides, comprised of n$_L$/n$_f$/n$_L$ and n$_H$/n$_f$/n$_H$ can be replaced by homogeneous layers in the x-direction with effective indices n$_{L,eff}$ and n$_{f,eff}$, respectively, where these effective indices have been calculated using the standard symmetric slab waveguide eigenvalue equation. The effective indices for these two slabs are calculated for both transverse-magnetic (TM) and transverse-electric (TE) polarizations in FIG. 2b and FIG. 2c, respectively, with example refractive index values of n$_f$=2.5, n$_H$=2.0, and n$_L$=1.5. Using the cut-off condition for the second supported mode the maximum waveguide width for single-mode operation can be expressed as:

$$w_{max} = \frac{\lambda}{2\sqrt{n_f^2 - n_H^2}} \qquad (1)$$

For the indices used in FIGS. 2b and 2c the maximum width for single-mode operation occurs when w≈0.33λ. The effective index solutions to these slab waveguides are then used to treat the dielectric layers in the y-direction as homogeneous media, and the supported modes of the two dimensionally confined structure are found by solving for the asymmetric slab waveguide shown in FIG. 1. Depending on the value of w chosen, the substrate index of the asymmetric waveguide can be defined as follows:

$$n_s = \begin{cases} n_{L,eff}, & \text{if } n_{L,eff} > n_H \\ n_H, & \text{if } n_{L,eff} < n_H \end{cases} \quad (2)$$

and a cladding index of:

$$n_c = \begin{cases} n_H, & \text{if } n_{L,eff} > n_H \\ n_{L,eff}, & \text{if } n_{L,eff} < n_H \end{cases} \quad (3)$$

with the condition $n_H < n_{f,eff}$ and $n_{L,eff} < n_{f,eff}$. The effective index of the two dimensionally confined mode is again calculated using an asymmetric waveguide eigenvalue equation, as shown in FIGS. 2e and 2f. Since the modes are two dimensionally confined, pure TE and TM modes no longer exist. However, we can define two lowest order modes with orthogonal polarization, which we label quasi-TE ($E_x$-dominant) and quasi-TM ($E_y$-dominant). Note that, for consistency in the polarization definitions, the quasi-TE mode are calculated with the TM effective slab indices and the quasi-TM mode are calculated with the TE effective slab indices. There are two shaded regions in both FIG. 2e and FIG. 2f, corresponding to $n_H > n_{L,eff}$ and $n_H < n_{L,eff}$. In the first case the higher index confinement layer acts as the substrate of the asymmetric waveguide and the lower slab waveguide acts as the cladding. In the second case these designations are reversed. By operating in the lower region of the dispersion curve with $n_s = n_H$ most of the field penetration occurs into the confinement layer, relaxing the requirements on the buffer layer thickness for low leakage at the expense of confinement in the high-index guiding region.

The limits on allowable height for single mode operation are found by the cut-off condition for the lowest and first order modes of the asymmetric waveguide in FIG. 2d, which can be parameterized by an asymmetry parameter a:

$$a = \begin{cases} \dfrac{n_s^2 - n_c^2}{n_{f,eff}^2 - n_s^2}, & \text{quasi-}TE \text{ mode} \\ \left(\dfrac{n_{f,eff}}{n_c}\right)^4 \dfrac{n_s^2 - n_c^2}{n_{f,eff}^2 - n_s^2}, & \text{quasi-}TM \text{ mode} \end{cases} \quad (4)$$

This parameter can be used to determine the minimum and maximum waveguide height h for a given w:

$$h_{min} = \frac{\lambda \tan^{-1} \sqrt{a}}{2\pi \sqrt{n_{f,eff}^2 - n_s^2}} \quad (5)$$

$$h_{max} = \frac{\lambda(\tan^{-1} \sqrt{a} + \pi)}{2\pi \sqrt{n_{f,eff}^2 - n_s^2}} \quad (6)$$

These bounds on the waveguide height are plotted as the bounding curves in FIGS. 2e and 2f. Note that when $n_{s,eff} = n_H$ the asymmetry parameters in Eqn. 4 becomes 0, and $h_{min} = 0$. The width at which the vertical slab waveguide becomes symmetric is indicated by the vertical black dashed lines in FIGS. 2b and 2c. For $n_{L,eff} < n_H$, $h_{min}(w)$ occur when $n_{eff} = n_H$.

These equations are matched using finite-difference method (FDM), as indicated by circles in FIGS. 2e and 2f, illustrating that the effective index method provides a good approximation to the waveguide dispersion. To illustrate the usefulness of this type of waveguide, geometries in two potential material platforms are explored: diamond and silicon.

Figure 3A:
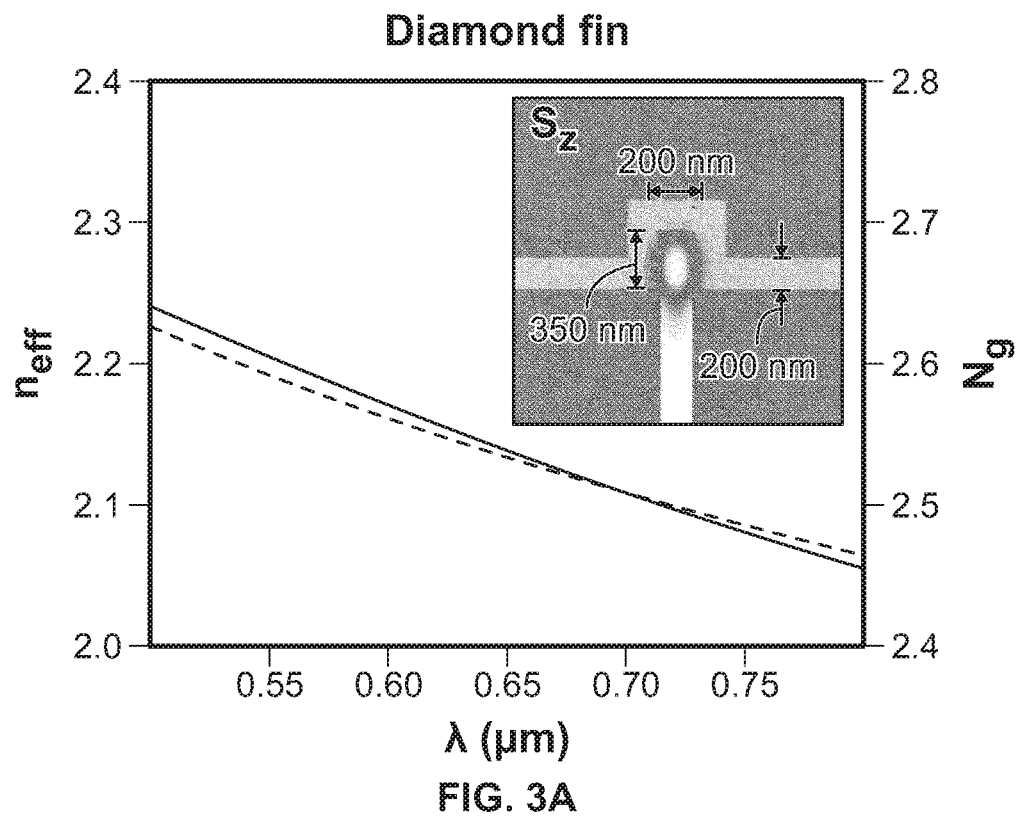
FIG. 3a is a plot of calculations for the QTE mode of a diamond waveguide at $\lambda=637$ nm where FDM calculated effective index $n_{eff}$ and group index Ng versus wavelength (main portion) and a Poynting vector Sz of the mode at the design wavelength (inset), according to an example embodiment.
Figure 3B:
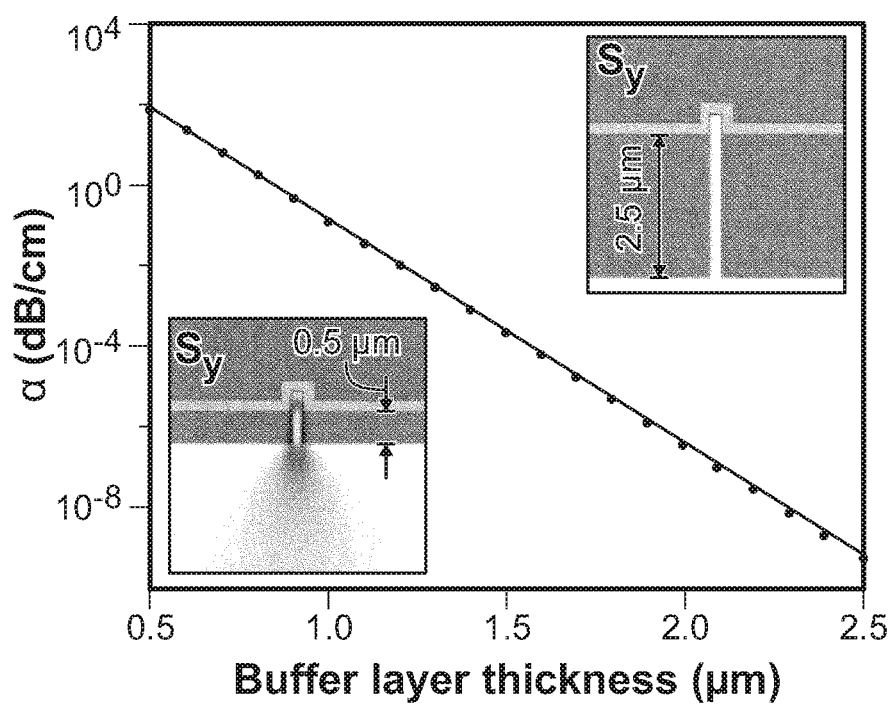
FIG. 3b is a plot of calculations for the QTE mode of a diamond waveguide at $\lambda=637$ nm where propagation loss, a, versus buffer layer thickness, and where solid lines are FDM calculated with an absorbing boundary condition, points are calculated from the unperturbed FDM calculated mode using first-order perturbation theory, and Poynting vector in the y-direction, Sy, for buffer layer thicknesses of 0.5 μm and 2.5 μm (insets), according to an example embodiment.

The diamond waveguide is designed with an $SiO_2$ buffer layer, a conformal 200 nm-thick confinement layer, and $SiO_2$ over cladding for single-mode operation at a wavelength of 637 nm. The operating wavelength corresponds to the nitrogen-vacancy center zero phonon line. The waveguide design for maximum confinement in diamond occurs when $n_{L,eff} = n_H$ and $h = h_{max}$. The Poynting vector, $S_z$, of the quasi-TE mode at λ=637 nm is shown in FIG. 3a (inset) along with the waveguide dimensions. At this wavelength, the material stack has the following refractive indices: $n_{diamond} = 2.41$, $n_{Si_3N_4} = 2.01$, and $n_{SiO_2} = 1.46$ as determined from Sellmeir equations for each material. The group index, defined as the ratio of the vacuum speed of light to the group velocity $N_g = c/v_g = c(d\omega/d\beta)$, is also shown in FIG. 3a. The propagation loss as a function of buffer layer thickness is plotted in FIG. 3b, where the solid line has been calculated by FDM with an absorbing boundary condition and the circles are calculated using first-order perturbation theory of the unperturbed FDM calculated eigenmode. The Poynting vector in the y-direction, $S_y$, for two different buffer layer thicknesses is inset. Using a conformal map, the bending loss for a bend radius of 5 μm is determined to be 11 dB/cm with a buffer layer of 2 μm.

Figure 4A:
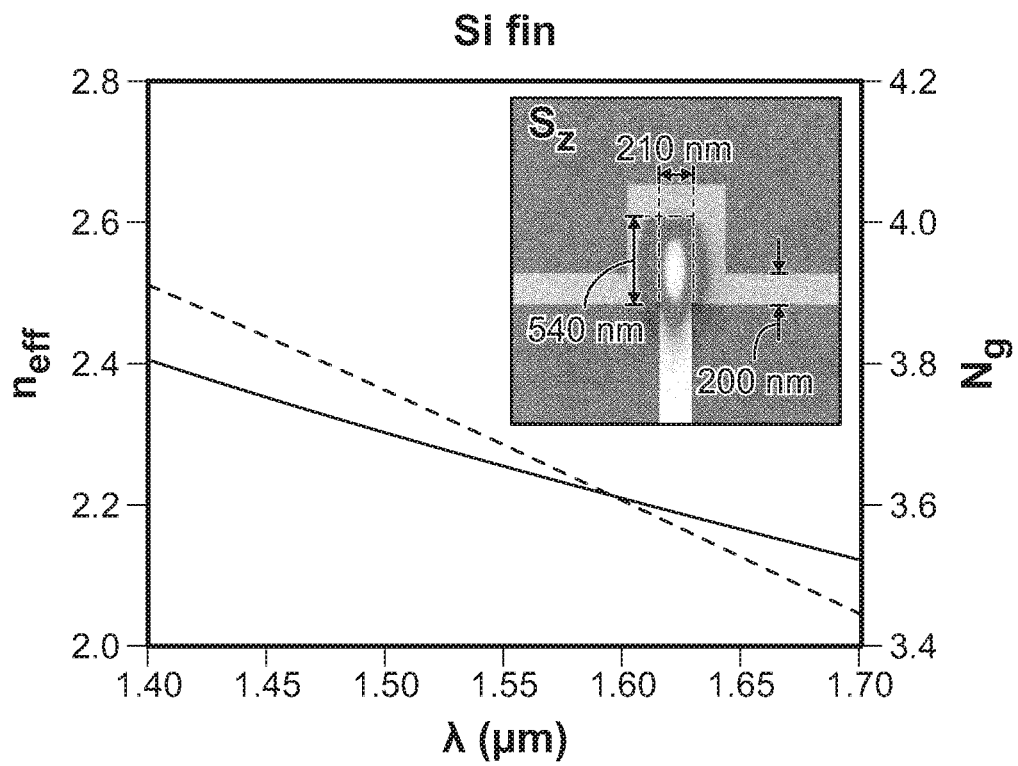
FIG. 4a is a plot of calculations for the QTE mode of a silicon waveguide at $\lambda=1.55$ μm where FDM calculated effective index $n_{eff}$ and group index Ng versus wavelength (main portion) and Poynting vector Sz of the mode at the design wavelength (inset), according to an example embodiment.
Figure 4B:
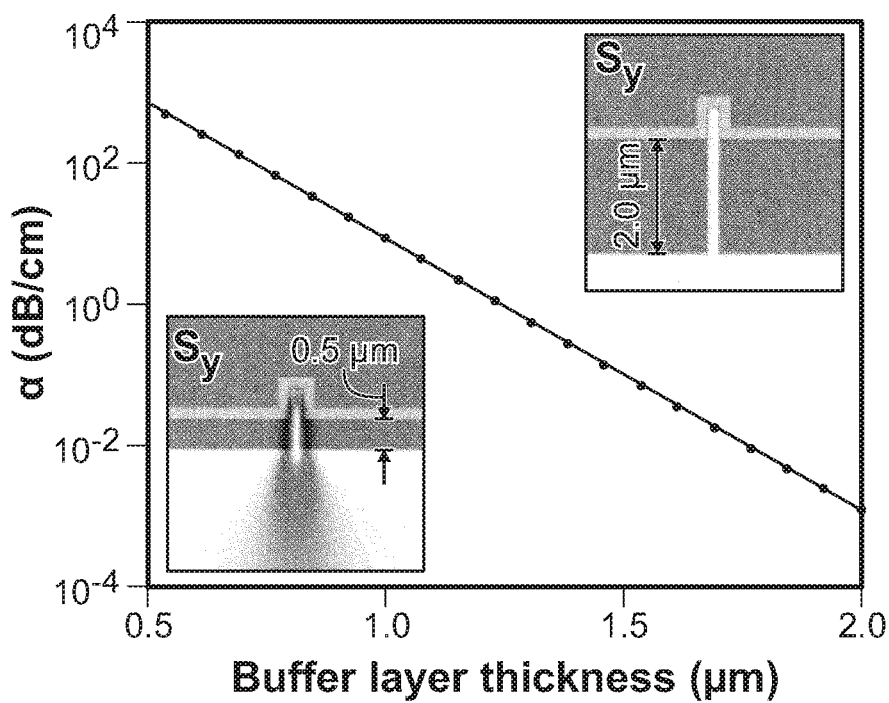
FIG. 4b is a plot of calculations for the QTE mode of a silicon waveguide at $\lambda=1.55$ μm where Propagation loss, a, versus buffer layer thickness, and where solid lines are FDM calculated with an absorbing boundary condition, points are calculated from the unperturbed FDM calculated mode using first-order perturbation theory, and Poynting vector in the y-direction, Sy, (insets) for buffer layer thicknesses of 0.5 μm and 2.0 μm, according to an example embodiment.

The silicon waveguide is also designed for maximum confinement, and the quasi-TE mode profile at λ=1.55 μm is shown in FIG. 4a (inset) along with the dimensions. At λ=1.55 μm the material stack has the following refractive indices: $n_{Si} = 3.48$, $n_{Si_3N_4} = 1.98$, and $n_{SiO_2} = 1.44$. The effective index and group index of the quasi-TE mode are plotted in FIG. 4a, and $S_z$ of the mode at λ=1.55 μm is inset. The bending loss for a bend radius of 5 μm is determined to be 11 dB/cm with a buffer layer of 2.5 μm. The parameters of both the diamond and silicon waveguides shown in FIGS. 3 and 4 are comparable to channel waveguides in the same material platforms.

A potential fabrication flow for the proposed device designs would start by lithographically defining the waveguide fin in a hard mask, followed by a deep anisotropic dry etch. Subsequently, plasma enhanced chemical vapor deposition (PECVD) of $SiO_2$ followed by a planarization step can form the buffer layer, and a selective $SiO_2$ etch can expose the desired fin height, h. Finally, the $Si_3N_4$ confinement layer can be deposited via PECVD and patterned. While the analysis presented here has been for a $Si_3N_4$ confinement layer, this waveguide design is applicable for any materials stack with $n_H > n_L$. Keeping $SiO_2$ as the buffer material, other alternatives for the confinement layer include $Al_3O_2$ (n≈1.8), AlN (n≈2.2), and SU-8 (n≈1.5). Similarly, drip, spin cast, or sputtered polymer layers can also be used to engineer a supported waveguide mode.

Aspects of the invention described herein are compatible with a number of standard fabrication processes, and can be designed for any number of emerging high index substrate applications including silicon photonics and quantum information science. Because it alleviates the need for a buffer layer, this approach can lead to rapid development of photonic integrated circuits on emerging substrate materials.

A set of on-chip passive and active optical elements may be produced that combines the versatility, robustness, and small size of silicon photonics with the unique material properties of diamond. Embodiments of the invention solve many of the problems that have impeded earlier efforts in terms of fabrication complexity, scalability, and robustness, and—since there is no longer a buried layer of oxide or other substrate material—new opportunities are provided for the design of functional optical elements.

Waveguide couplers, either between propagating waveguides (e.g., to create a Mach-Zehnder interferometer) or between waveguides and resonator structures, can be formed by controlling the spacing and coupling length through top-down patterning, as in established approaches using thin films or SOI structures.

As with electronic integrated circuits, desired functionality of PICs includes active devices including switches, modulators, light sources, and detectors, together with electronic circuitry. Such components are extremely challenging to engineer using the established thin-film approach to fabricating diamond photonic structures. Initial steps in that direction include on-chip Raman laser. An architecture in accordance with aspects of the invention may be built on bulk single crystal diamond that can be doped and fabricated into diode structures, which presents exciting new opportunities for active, electrically controlled devices.

Amplitude and phase modulators form the basis for optical switches and data encoding, and new applications such as phased antenna arrays and quantum linear photonics. Two mechanisms to achieve phase modulation in silicon PICs are the thermo-optic effect and free-carrier plasma dispersion. The former leverages the relatively large thermo-optic coefficient (TOC) of silicon ($dn=dT=1.9\times10^{-4}$ $K^{-1}$) and has the advantage of being lossless, but the disadvantage of being relatively slow and requiring large separations between devices to maintain thermal isolation. The latter has the advantage of being much faster, but the disadvantage of intrinsic optical loss due to free-carrier absorption.

In many cases, thermo-optic modulators are used to actively stabilize silicon PICs, since the large TOC leads to a high sensitivity to thermal fluctuations on the chip. Diamond, in contrast, has a much higher thermal conductivity (1800 W/m*K compared to 130 W/m*K for silicon) and a lower TOC ($10^{-5}$ $K^{-1}$). On the one hand, these properties will make diamond PICs much more stable than those in silicon, removing the need for active stabilization and enabling high-power operation. On the other hand, thermo-optic modulators in diamond may require a larger change in temperature to create a comparable phase shift. For architecture in accordance with aspects of the invention, the thermo-optic shift is likely to be dominated by the TOC of the cladding material (e.g., $4.7\times10^{-5}$ $K^{-1}$ for $Si_3N_4$) to provide the best of both worlds. Diamond's high thermal conductivity and the strong thermal grounding provided by the fin structure enables faster modulation speeds than in silicon, and with higher isolation between components, although this enhanced functionality potentially comes with higher power requirements for the heater elements.

The potential to include vertical diode structures in the waveguide fin opens up opportunities to achieve fast modulation based on free-carrier effects. Possible devices include PIN, metal-oxide-semiconductor capacitor (MOSCAP), and plasmonic MOSCAP structures. The PIN and MOSCAP structures can function as fast phase modulators, whereas the plasmonic structure is a highly compact and efficient amplitude modulator.

Electrically driven on-chip light sources (e.g. lasers) are of particular interest. Diamond hosts hundreds of optically-active defects which fluoresce at wavelengths spanning the visible and near infrared. Broad-band visible electroluminescence from diamond has been demonstrated in several cases and PIN diode structures have recently been employed to electrically excite both the neutral NV defect (emission between 575-750 nm) and the negatively charged SiV defect (emission around 736 nm). A diode structure embedded in an integrated cavity may be employed to realize electrically-pumped, on-chip lasers. A high density of NVs or SiVs can be incorporated into the intrinsic region of the PIN structure either through implantation or during growth. On-chip lasers based on NV0 emission around its zero phonon line of 575 nm would be of particular interest for integrated quantum devices based on NV spins, since the light can be used to efficiently pump NV defects elsewhere in the circuit.

At the opposite extreme of low defect density, both NVs and SiVs are attractive room-temperature sources of single photons for applications in quantum key distribution and integrated linear optics. The SiV defect is particularly attractive in this regard, since it produces bright, narrow-band emission at room temperature and indistinguishable photons at low temperature.

Single photon avalanche diode (SPAD) detectors on a silicon CMOS chip may be integrated with diamond PICs through a flip-chip approach. Grating couplers can be designed to deflect photons to SPADs on the silicon circuit, such that molecular-scale wafer bonding is not needed. Once the chips are aligned, they can be encapsulated in epoxy. The visible transparency of the diamond substrate provides advantages both for alignment and also since optical input signals can be routed through the backside of the diamond towards grating couplers designed to direct light to/from the substrate. Silicon CMOS SPADs can be operated close to room temperature with low noise and high efficiency, and the CMOS circuit can also include amplifiers and functionality for time-correlated single photon counting, data compression, and transfer buffers as required.

Diamond is an attractive platform for nonlinear photonics, since it combines a large transmission window (UV to far-infrared) with a relatively high nonlinear refractive index and excellent thermal properties for handling high optical powers. These properties enable the generation of optical frequency combs for precision measurements and efficient frequency conversion for single photons. The fin-waveguide design provides a better thermal sink than diamond membrane structures, which will enable operation of these devices at significantly higher optical power densities and correspondingly stronger nonlinear effects.

The diamond PIC platform can be used for various applications. In one example application, a miniature on-chip magnetometer may be developed in accordance with aspects of the diamond PIC platform. Near-infrared absorption around the zero-phonon line of the NV's singlet transition (1042 nm) is used, which together with appropriate time-domain control with visible light and microwaves provides a readout of the ensemble spin projection that is not limited by photoluminescence shot noise. An external cavity enhances the interaction, which in the limit of critical coupling can lead to 100% absorption contrast, taking maximum advantage of the NV ensemble for sensing small variations in magnetic field.

Figure 5:
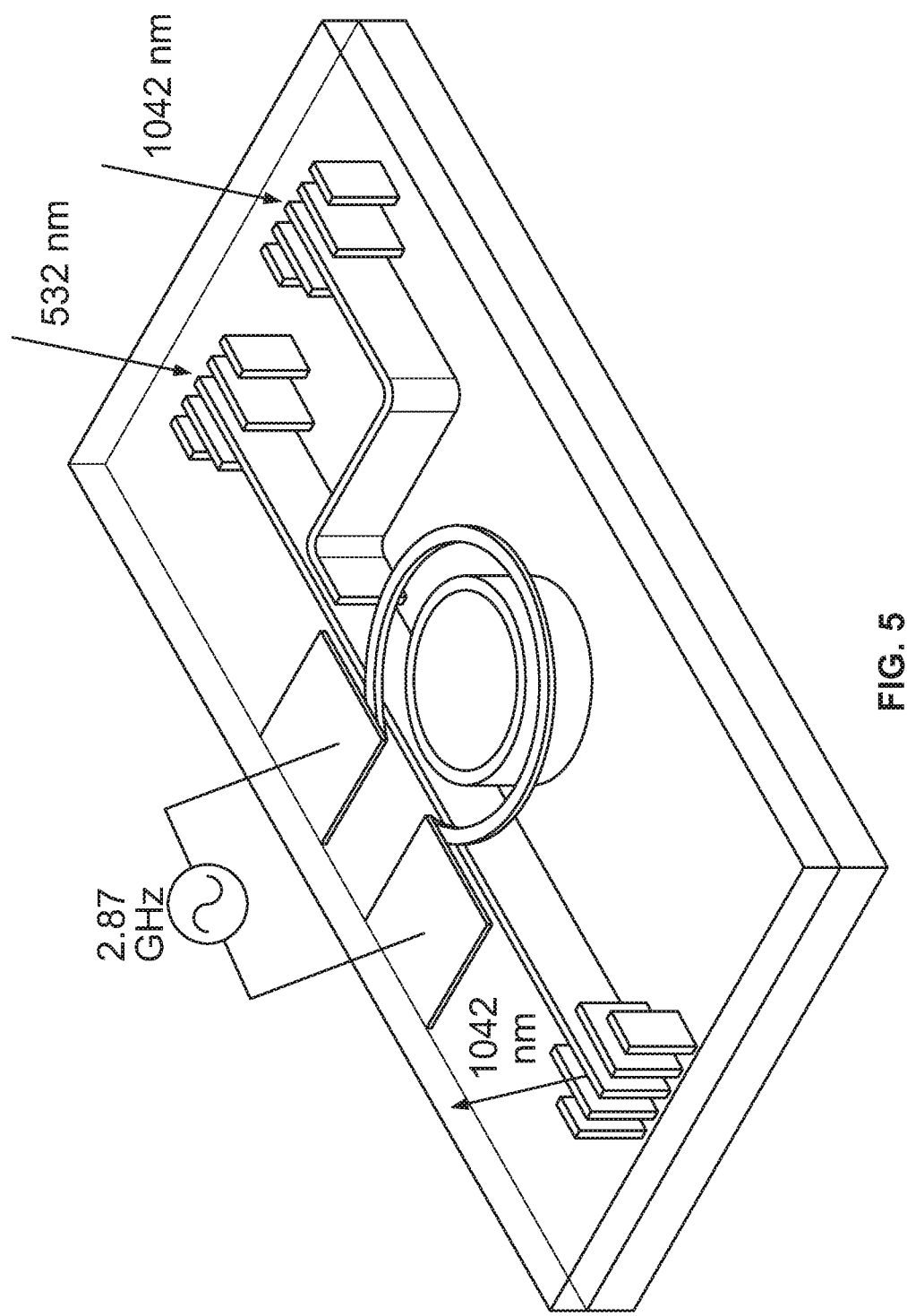
FIG. 5 is an on-chip quantum magnetometer, according to an example embodiment.

The proposed device (FIG. 5) includes a waveguide coupled to a resonator, with appropriate couplers and filters to provide both visible (532 nm) and 1042 nm light and to detect the NIR transmission. Aspects of the PIC architecture described herein supports fabrication of an on-chip antenna aligned with the resonator to deliver microwave excitation to the NV ensemble. If needed, the antenna can be fabricated directly on the diamond substrate to facilitate optimal heat dissipation and the generation of large on-chip fields for fast spin control.

Figure 6:
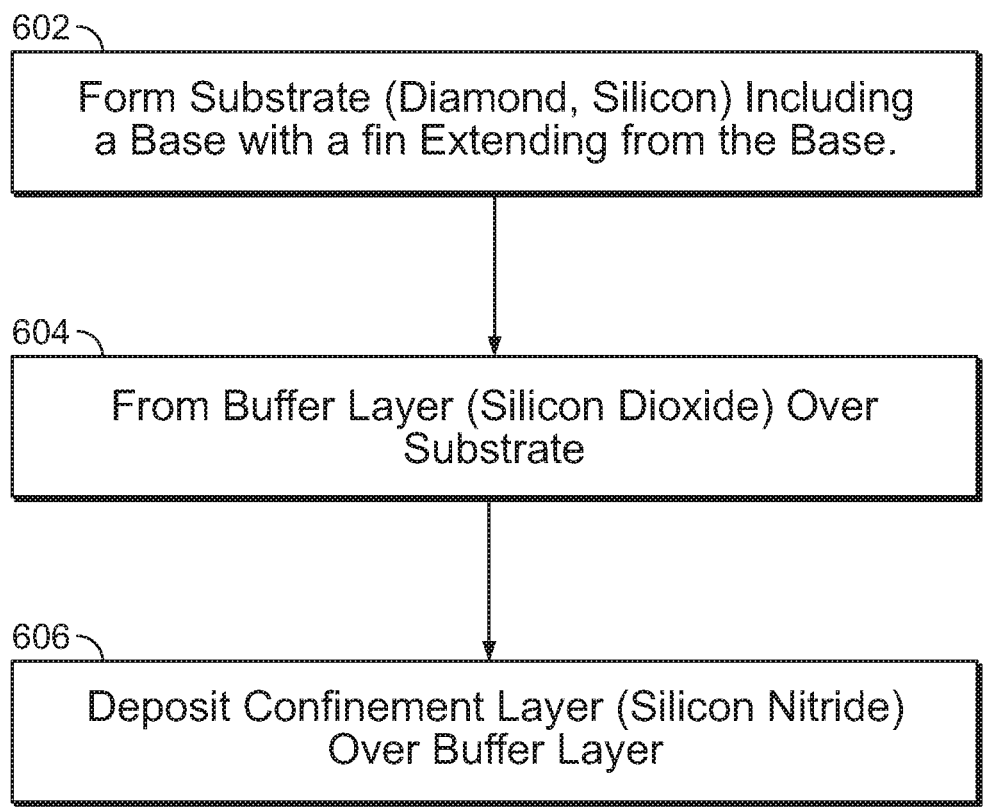
FIG. 6 is a flowchart describing a method for fabricating the waveguide in FIG. 1, according to an example embodiment.

FIG. 6 is a flowchart describing a CMOS processing method for fabricating the waveguide in FIG. 1. In step 602, a substrate is formed having a base and a fin. The substrate may be formed by etching the fin from a high-index material (e.g., diamond, Si, etc.). In step 604, a buffer layer is formed over the substrate leaving a portion of the fin exposed. The buffer layer may be a low-index material (e.g., $SiO_2$) conformally deposited with a thickness exceed the fin height. After deposition, the buffer layer may be planarized and selectively etched to expose a desired portion of the fin. In step 606, a confinement layer (e.g., silicon nitride) is conformally deposited over the buffer layer and the fin. The substrate has a refractive index that is greater than the refractive index of the confinement layer. The confinement layer has a refractive index that is greater than the refractive index of the buffer layer.

Figure 7:
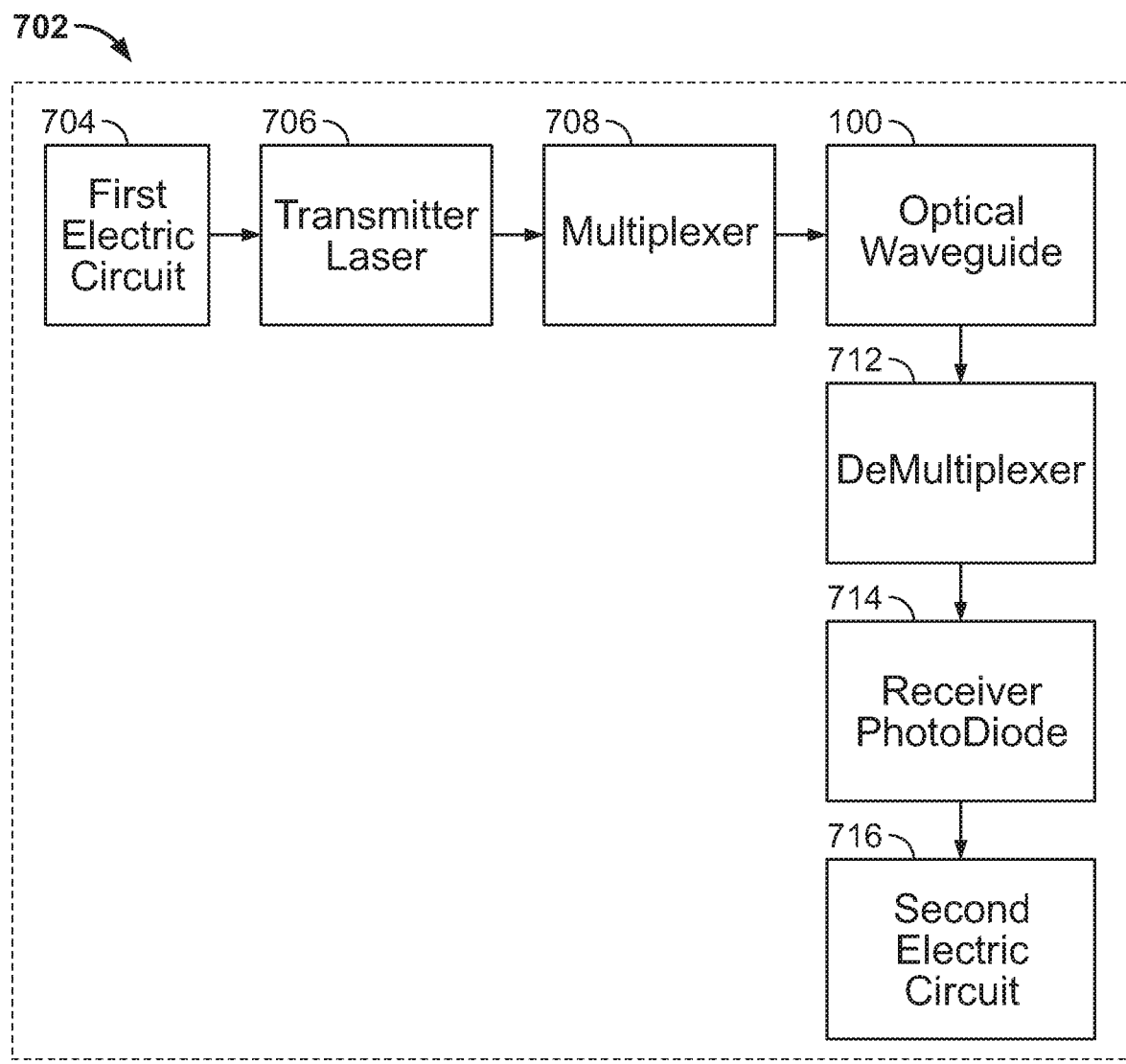
FIG. 7 is a diagram of a CMOS circuit that includes the optical waveguide in FIG. 1, according to an example embodiment.

The steps described in the fabrication example above are all compatible with CMOS processing, and the structure is compatible with standard silicon wafers for CMOS electronics, thereby allowing photonic and electronic devices to be fabricated on the same chip (i.e. PICs and electronic circuits on the same chip). FIG. 7 is a diagram of a PIC and two electronic circuits fabricated on the same chip.

In this example, through CMOS processing, substrate 702 (e.g., diamond or silicon substrate) is fabricated to include multiple optical and electronic devices. Specifically, the devices include electric circuits 704 and 716 connected to each other via a PIC including laser transmitter 706, optical multiplexer 708, optical waveguide 100, optical de-multiplexer 712, and receiver photo-diode 714.

Embodiments of the waveguides described in the application have unique thermal properties for high-power applications. The geometry of the fin waveguide entails a direct material link between the waveguide and the substrate. Besides making the structure easier to fabricate, this geometry changes the device's thermal characteristics by providing a built-in heat sink to the substrate. Diamond, in particular, is an exceptional thermal conductor, and widely desired as a heat-sinking material; its room-temperature thermal conductivity of >20 W=cmK is more than five times higher than copper and nearly twenty times higher than silicon. The fin waveguides, therefore, can be highly resilient to thermal stresses induced by high optical powers, making the architecture suited to applications in nonlinear optics including on-chip lasers, wavelength converters, and generation of super-continuum light and frequency combs.

More efficient heat sinking also leads to better thermal stability and faster thermal modulation for fin-waveguide PICs in both diamond and silicon compared to traditional architectures. Uncontrolled thermal variations are a challenge for large-scale silicon PICs, limiting the practical communication bandwidth and requiring special thermal designs or active feedback tuning to suppress changes in refractive index. Similarly, while thermo-optic modulators are commonly used to tune resonators and interferometers, poor thermal links limit the modulation speed and isolation between neighboring devices.

The fin waveguide architecture for silicon PICs is great for electronic-photonic co-integration in silicon. The SOI platform has limitations when it comes to combining electronic and photonic functionality, since the thick buried oxide required for waveguide isolation is not compatible with conventional CMOS wafers for electronic circuits. Current workarounds to that problem involve hybrid integration of separately-fabricated electronic and photonic chips, or back-end-of-line processing of photonic circuits on CMOS electronic devices using alternative materials such as poly-silicon and silicon-nitride.

Since the fin waveguide architecture can be formed on conventional silicon CMOS substrates using standard processing steps for VLSI electronics (etching, dielectric deposition, etc.), it can support low-loss PICs formed from single-crystal silicon alongside electronics in the same device layer. This reduces cost and improves performance of electronic-photonic integrated circuits, and opens the door to design of new types of high-speed active photonic components. For example, the ability to incorporate vertical diode structures in the waveguide fin opens up opportunities to achieve fast modulation based on free-carrier effects.

Figure 8:
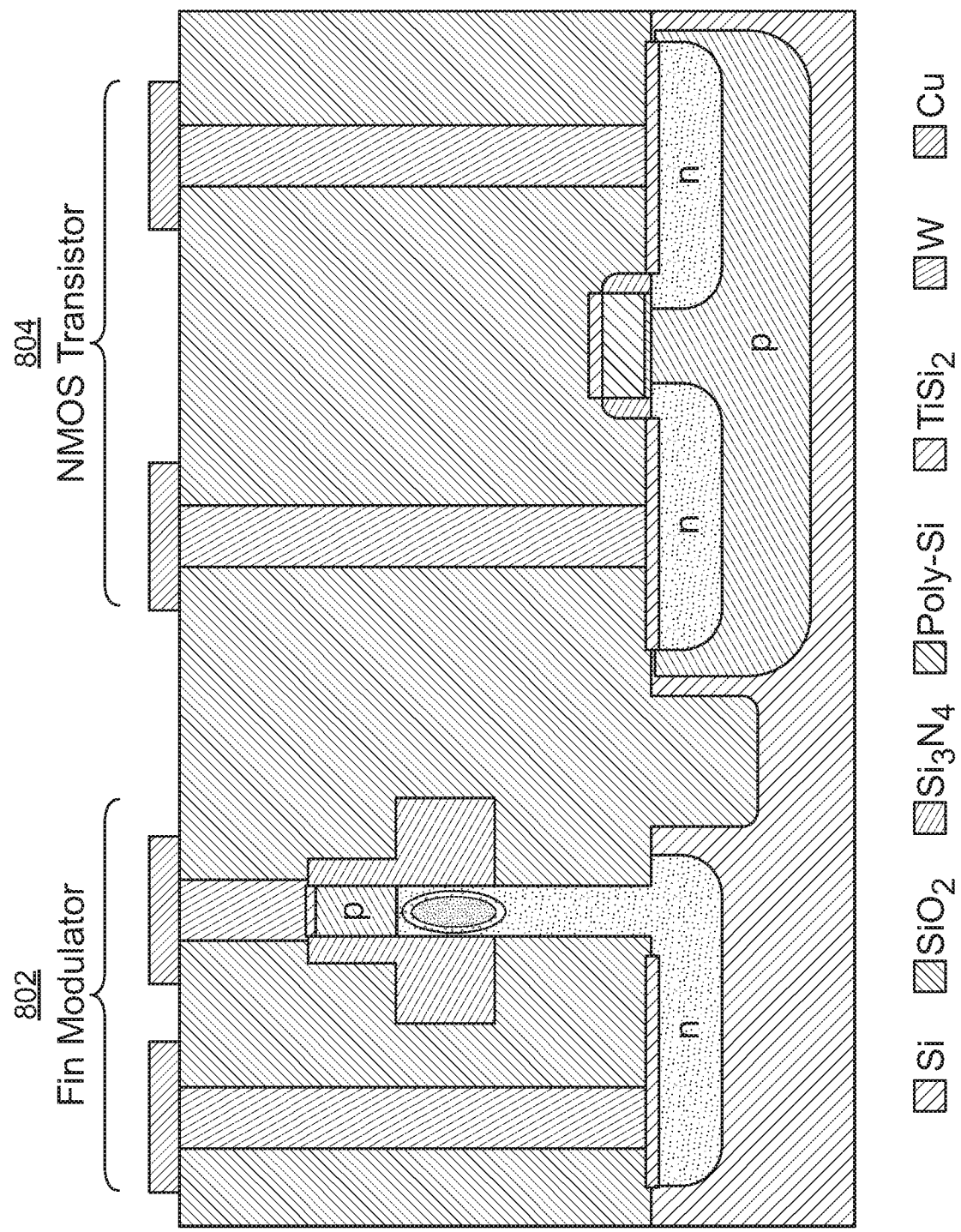
FIG. 8 is a schematic view of a fin waveguide modulator co-integrated with an NMOS transistor in silicon CMOS, according to an example embodiment.

FIG. 8 shows a fin-waveguide-based fin modulator 802 fabricated next to a standard NMOS transistor element 804. Such co-integration leads to new generations of technologies that can take full advantage of the speed and computational density of CMOS electronic components together with the ultralow power dissipation of photonic circuits.

Figure 9:
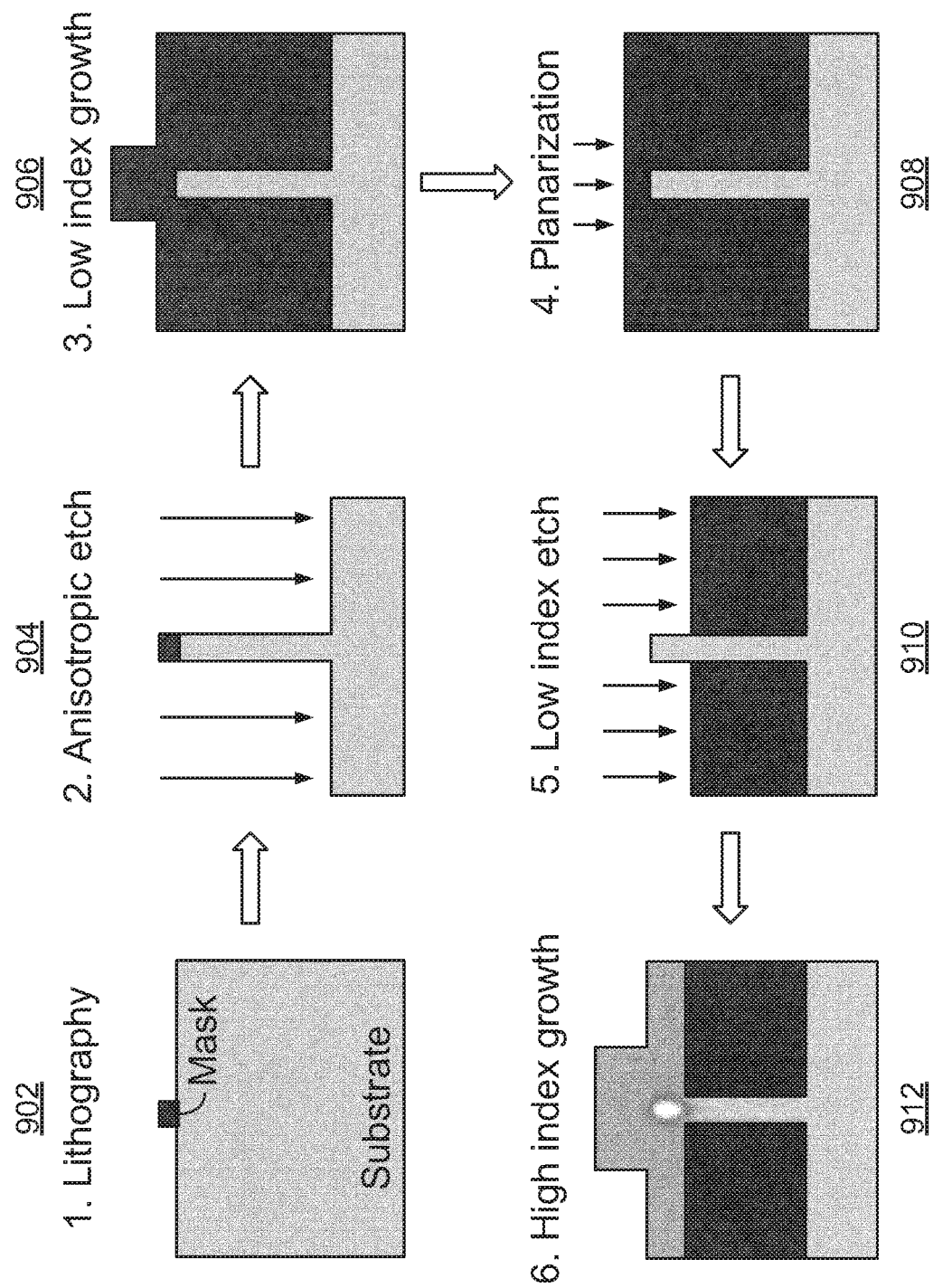
FIG. 9 is a schematic view of a fabrication process for a fin waveguide, according to an example embodiment.

A suitable fabrication flow for embodiments of the fin waveguides is shown in FIG. 9. Other suitable fabrication processes will be understood by one of skill in the art from the description herein. The fabrication steps shown in FIG. 9 are as follows:

1. Lithography (step 902): Electron beam or deep-UV lithography are implemented for placing a mask on the substrate.

2. Anisotropic etch (step 904): Inductively-coupled plasma reactive-ion etches (ICP-RIE) provide high-aspect ratio structures in many high-refractive-index materials and is used to etch the substrate.

3. Low index growth (step 906): Optical quality SiO2 can be grown on the substrate by plasma-enhanced chemical vapor de-position (PECVD) or low-pressure chemical vapor deposition (LPCVD). Alternatively, spin casting can be used for the application of flowable oxides, other low index polymer layers, or chalcogenide glasses.

4. Planarization (step 908): Planarization is a step of removing at least a portion of the low-index layer to flatten the growth. This step can be achieved by chemical-mechanical polishing (CMP) or local oxide growth and anisotropic etching.

5. Low index etch (step 910): Selective (e.g. Anisotropic) etching is another step of removing at least a portion of the low index layer to expose a portion of the fin. This step can be performed using ICP-RIE or capacitively-coupled RIE.

6. High index growth (step 912): The high-index confinement layer can be grown on the fin by PECVD or LPCVD of Si3N4 (n≈2.0), sputtering of Al2O3 (n≈1.8) or AlN (n≈2.2), spin casting other high index polymer layers such as SU-8 (n1.5), or deposition of Hydex (n=1.5 to 1.9).

Each step of the illustrated fabrication flow is compatible with a conventional CMOS process used for VLSI electronics, making the fin waveguide suitable for photonic-electronic co-integration. The proposed implementation alleviates the need for silicon-on-insulator (SOI) with a thick buried-oxide-layer, providing a pathway for implementing optical interconnects on VLSI chips.

The fin waveguide architecture is also an enabling technology for producing scalable diamond based platforms for quantum information processing. By forming PICs directly from high-purity, single crystal diamond substrates, it is possible to deterministically align photonic structures to individual defect spins that are either preselected from natural ensembles or controllably created. Furthermore, the architecture's resiliency to high optical powers facilitates efficient wavelength conversion between the native optical transition frequencies of spin defects in the visible-to-near-infrared spectrum and the telecommunications band at 1550 nm for low-loss fiber transmission of single photons.

Figure 14:
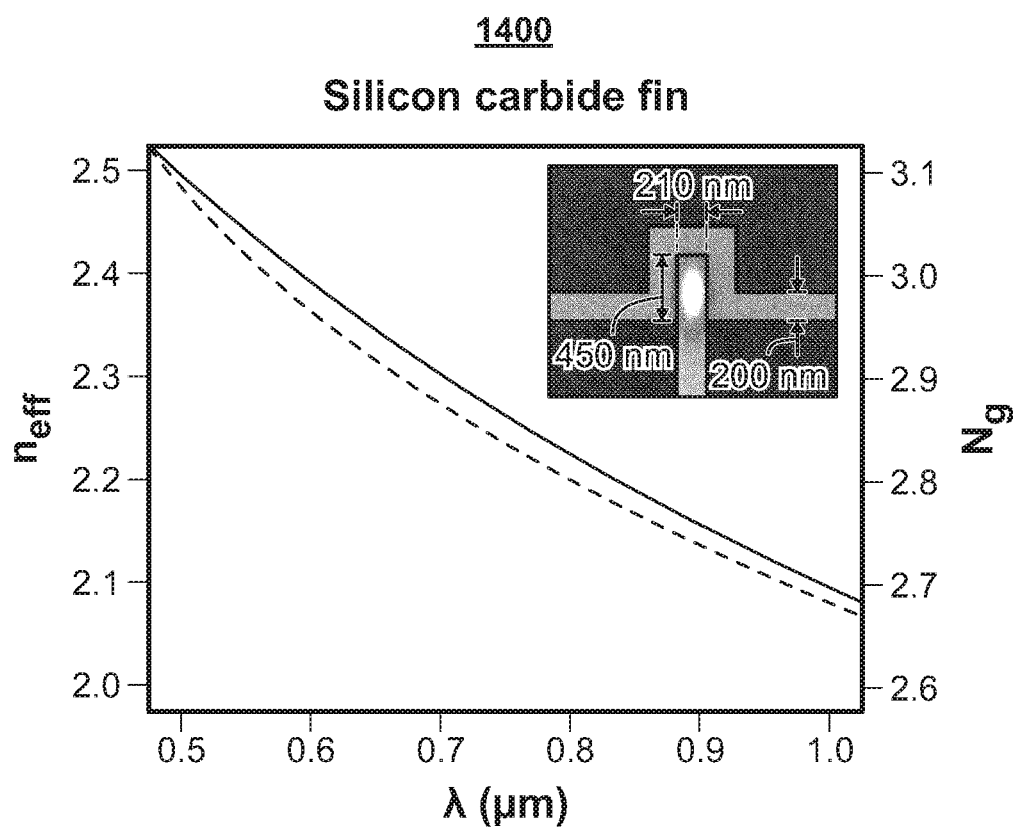
FIG. 14 shows a view of a design and optical dispersion calculations for a fin waveguide formed from silicon carbide, according to an example embodiment.

The platform can also be realized in other high-index materials including silicon carbide, which also hosts defect spins with room-temperature coherence properties. Silicon carbide is particularly interesting since it shares many of diamond's desirable properties but is more technologically advanced as a semiconductor host, with wafer-scale production of CMOS electronic devices already established. For example, FIG. 14 shows a design and optical dispersion calculations 1400 for a silicon carbide fin waveguide.

Other wide-band gap semiconductors of interest for quantum technologies include yttrium-oxide crystals containing rare-earth ions, ZnO and hexagonal boron nitride (hBN). Fin-waveguide PICs can be formed directly in many of these materials, or emitters could be coupled to diamond or silicon carbide PICs through heterogeneous integration, taking maximum advantage of each material platform.

Figure 10:
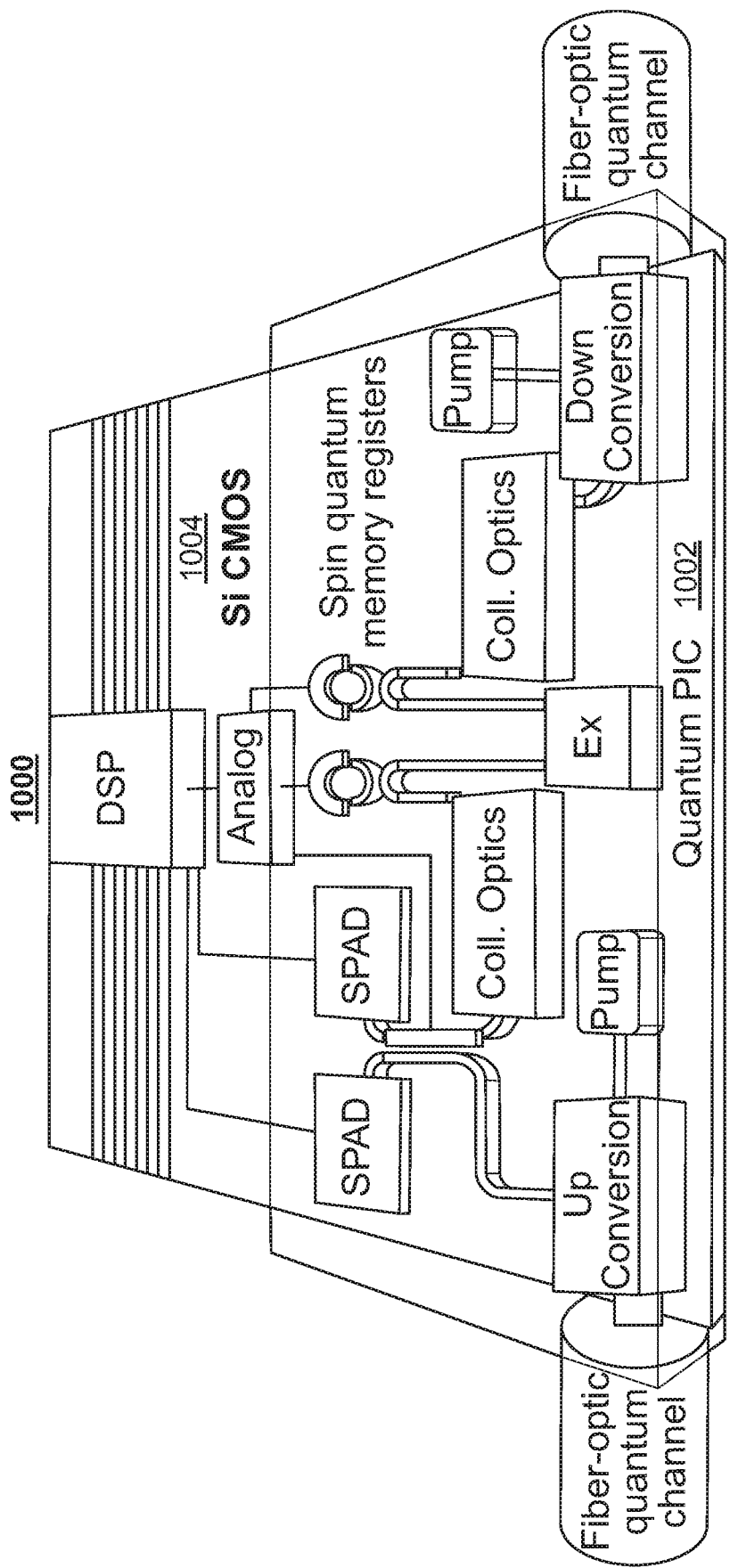
FIG. 10 is a schematic view of a fully integrated quantum repeater node, according to an example embodiment.

Reconfigurable low-loss PICs incorporating robust, electrically pumped single photon sources and long lived spin quantum memories can serve as a framework for wide-ranging quantum technologies. The addition of fast electro-optic modulators enables the dynamic adaptive reconfigurations necessary to execute quantum algorithms using linear optical networks. Ensembles of spins coupled to optical resonators can serve as precision atomic clocks, sensitive magnetometers, and biochemical sensors. With continued improvement in diamond materials, and in particular the passivation of surfaces that induce charge and magnetic noise on NV spins in nanostructures, the platform enables the realization of quantum repeaters, device-independent quantum security, randomness certification, and distributed quantum computing using photon-mediated entanglement between NVs. FIG. 10 presents an example of a solid-state spin-photon interface 1000 based on this technology, which combines quantum PICs 1002 with a silicon CMOS backbone 1004 to achieve on-chip classical and quantum information processing.

Figure 11:
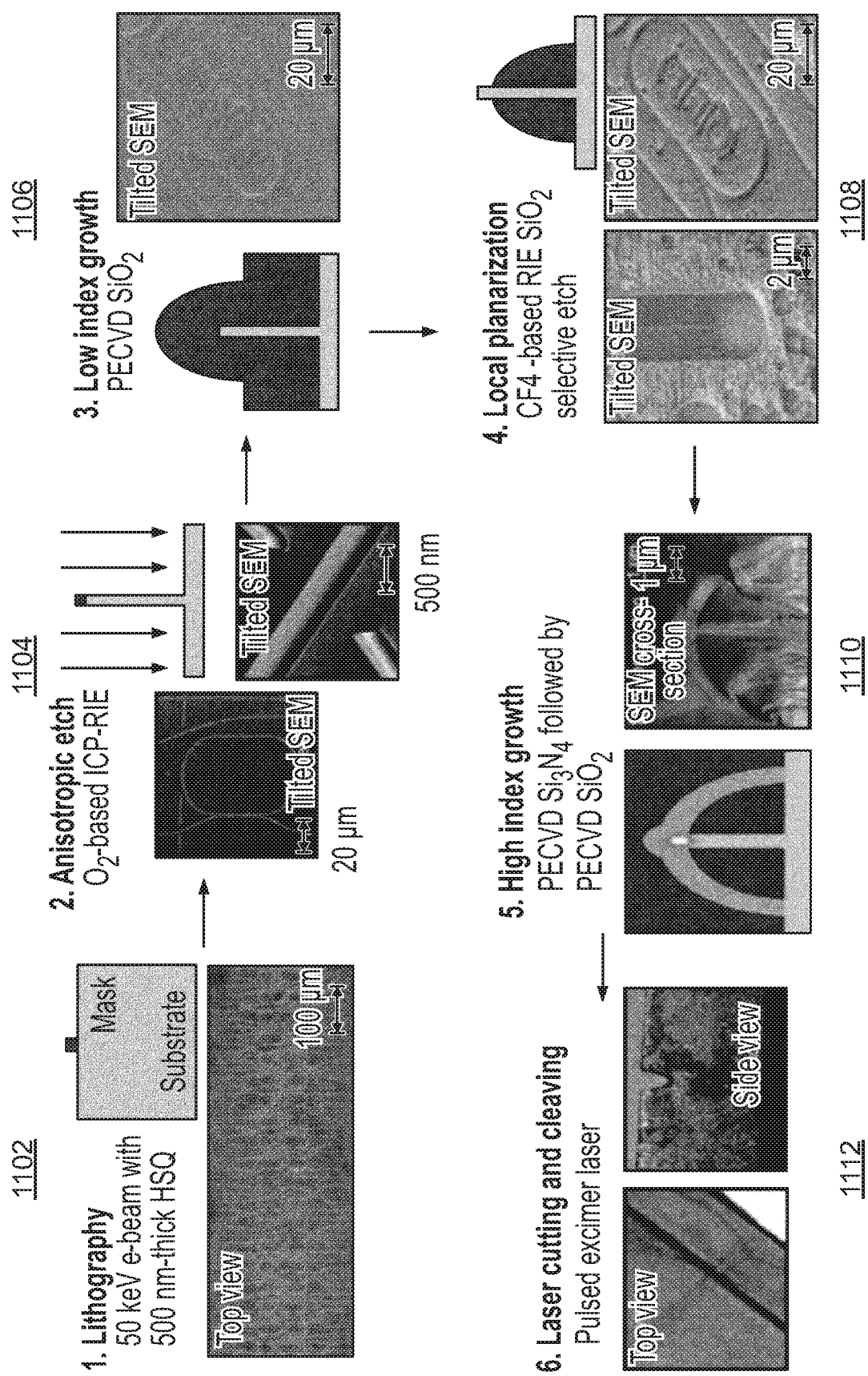
FIG. 11 is a view of an another fabrication process for a fin waveguide, according to an example embodiment.

Although FIG. 9 shows a fabrication flow, other fabrication flows are possible. One example of another fabrication flow for the passive waveguide circuit in diamond is shown in FIG. 11. The process begins by performing electron beam lithography on a 500-nm-thick hydrogen silsesquioxane (HSQ) resist (Fox-16, Dow Corning) to position a mask on the diamond substrate, as shown in step 1102. This negative resist converts to a glass-like substance when cross-linked by the electron beam, and can act as a hard masks with feature sizes below 10 nm.

Although diamond is highly resistant to wet chemical processing, dry etching techniques based on reactive ion etching (RIE) and inductively coupled plasma (ICP) are well established. The ICP method in particular, using an O2/Ar plasma, provides a highly anisotropic etch that is selective to diamond over hard mask materials including silica. The patterned HSQ hard mask is transferred to the diamond via ICP etching, resulting in smooth fin having vertical sidewalls as shown in step 1104.

After etching the fins, the lower oxide layer is formed by a low index growth process, whereby PECVD SiO2 is conformally grown both isotropically and anisotropically over the fin (step 1106) and subsequently anisotropically dry etched using a CF4-based reactive ion etching (RIE, Oxford PlasmaLab 80+) in a local planarization process (step 1108) which is a removing step for removing at least a portion of the low index growth to expose a portion of the fin. This results in a block of oxide surrounding the fin with the very tip of the fin protruding to form the "core" of the fin waveguide, as shown in step 1108. By precisely controlling the PECVD growth rate and etch rate calibration of the height of the top of the fin left sitting above the SiO2 is possible. Next, a 200-nm-thick layer of Si3N4 is deposited followed by a 3-micron thick capping layer of SiO2 is deposited by PECVD (step 1110) to cover the exposed portion of the fin. Finally, (step 1112) the back-side of the diamond is scribed using an excimer laser, and the ends of the waveguide are cleaved to expose them for optical coupling. For example, exposing a cross section of the fin waveguide may be accomplished by laser cutting, cleaving, or etching the waveguide to create a path for optical coupling with optical components.

An identical process may be used for silicon, with the exception of step 1104 which is performed using C4F8/SF6 chemistry in a dedicated deep silicon etching tool, and in step 1108 the removal of excess SiO2 is achieved through a combination of anisotropic dry etching and isotropic wet etching using buffered HF.

A suite of PIC components for various applications is now described. For example, for a PIC mode converter, an edge-fired coupler is created by tapering the diamond fin to a narrow point in order to adiabatically couple the diamond waveguide mode into a larger mode supported entirely in the cladding layer, which can be matched to the mode field diameter of a lensed tapered fiber. The cladding waveguides extend to the edge of the chip, where the end facets can be cleaved or laser-cut and coupled to tapered fibers for broadband transmission tests. This geometry facilitates characterization of the fabricated waveguide structures over a large optical bandwidth while decreasing the required alignment accuracy needed for coupling. For subsequent measurements focusing on a single wavelength or narrow band, grating couplers are engineered to enable vertical coupling on/off chip.

In another example, PIC power splitters and filters, waveguide couplers, either between propagating waveguides (e.g., to create a Mach-Zehnder interferometer) or between waveguides and resonator structures, are formed by controlling the spacing and coupling length through top-down patterning, as in the established approach using thin films or SOI structures. If ω increases beyond a critical value, the optical mode may leak to the substrate. Employing the concept of supermodes is a solution where multiple closely-spaced fin waveguides support a hybrid mode while maintaining vertical confinement within the cladding region.

An embodiment of a Y-branch coupler for diamond fin waveguides, has a length over which two adjacent waveguides remain in close proximity is selected to correspond to a beat length of the even and odd supermodes supported by the coupled waveguides. This illustrates the feasibility of this design approach, and indicate that the structure can operate as a power splitter in a narrow band with very low insertion loss.

Wavelength filters are also designed using both grating-based approaches as well as multimode interference-based devices. The supermode coupling techniques used for the power splitter are extended to other multimode interference devices commonly found in photonic integrated circuits including wavelength routers, and are also used to make vertical grating couplers.

While end-fired couplers are useful for testing of broadband device properties, grating couplers provide a more efficient solution for mode matching directly to optical fiber over a narrower bandwidth. In a grating coupler, efficient energy transfer can be achieved over a relatively short coupling region. The grating can be formed by etching holes in the waveguides or by subsequent patterning of the cladding layer, and the spacing can be chirped in order to focus the output beam.

To achieve tunable ring resonators and Mach-Zehnder interferometers in the PIC platform, thermo-optic modulators are designed by using resistive heaters to locally change the waveguide refractive index. As noted, the fin architecture provides enhanced thermal grounding compared to traditional waveguides, since the thermal conductivity of the single-crystal fin material is much higher than for the cladding materials. This improved thermal link to the substrate leads to higher modulation bandwidth at the expense of somewhat higher power consumption. In the case of diamond fins, the modulation effect may be dominated by the Si3N4 cladding, whose thermo-optic coefficient is five times higher than for diamond. Thus, the modulation performance may be optimized by changing the shape of the waveguide mode and its penetration into the cladding.

The fin waveguide architecture may also present be used for high-speed active optoelectronic components exploiting free-carrier absorption or plasmonic effects in vertical diode structures.

Since fin-waveguide PICs can be fabricated directly on bulk single-crystal substrates, the architecture allows for deterministic alignment of waveguides and cavities to pre-existing or intentionally created emitters. PIC devices containing nitrogen-vacancy (NV) spin ensembles will be important as compact sensors, while those addressing individual defects can serve as single-photon sources and quantum memories, with a scalable platform for distributed quantum information processing and quantum communication. Defects such as the diamond NV and silicon-vacancy (SiV) can be created at a desired depth using ion implantation or through delta-doping during chemical vapor-deposition growth of diamond. Control of the lateral position is also possible by using implantation masks, although the number of defects created in each targeted spot is still subject to random variations.

A process for aligning nanofabricated optical structures to individual pre-existing emitters has also been developed by using the excitation laser from a confocal microscope to locate emitters and then create alignment marks in a layer of polymer resist. A thin layer of Poly-methyl-methacrylate (PMMA) is deposited on the diamond surface, which is transparent to the excitation and collection wavelengths. Once a suitable emitter is found, automated laser position and power control may be used to burn alignment marks in the PMMA that can subsequently be located in an electron microscope. This process may be used to fabricate photonic structures such as fin waveguides, ring resonators, or photonic crystal cavities around preselected NVs.

Although the spatial resolution of the microscope and the size of the alignment marks are limited to several hundred nanometers by the optical diffraction limit, it is expected that the actual alignment accuracy to be much better, since alignment relies on locating the centroids of each feature rather than on their size. This approach can be adapted to fabricate optical cavities containing individual NV or SiV defects in diamond. To interface with electron-beam lithography (EBL) of the HSQ hard mask, optically-generated alignment marks are transferred onto the diamond and remove the PMMA before spinning the HSQ resist. This can be achieved either using the FIB as above to etch alignment marks into the diamond or by using EBL to pattern the PMMA (a positive e-beam resist) into a mask for evaporation of metal alignment marks. These secondary marks can then be used to confirm the overall alignment accuracy to the emitter through an additional imaging step in the confocal microscope. Finally, HSQ and pattern PIC structures may be deposited. The ultimate accuracy of this approach can be ~10-20 nm, limited by the scanning linearity of the confocal microscope and the alignment accuracy of the EBL tool. This accuracy is sufficient to align NV defects to optical ring resonators or 1D photonic crystal cavities.

Using this approach, PIC devices can be fabricated that interface cavity-coupled NV spins with photonic circuits. Both ring resonators and 1D photonic crystal cavities are considered, the latter of which can be fabricated analogously to grating devices by varying the spacing of holes in the fin or cladding layer. Ring resonators can support high quality factors and allow for precise wavelength tunability, since the resonance frequency can be adjusted using the thermo-optic effect, while photonic crystal cavities a smaller optical mode volume and therefore boost light-matter interactions.

Figure 12:
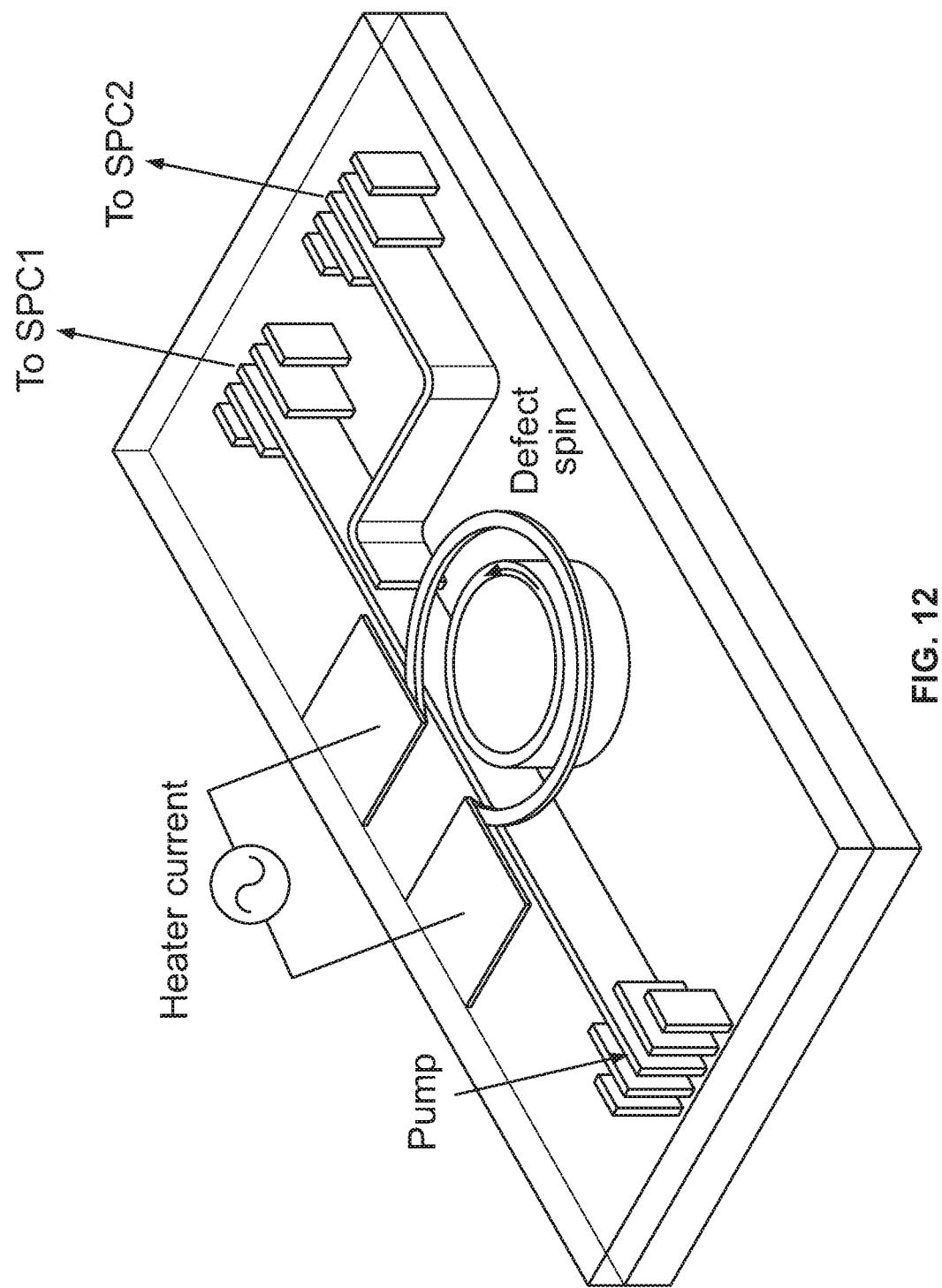
FIG. 12 is a schematic view of a quantum PIC, according to an example embodiment.

These devices can have wide applications as described above, ranging from compact magnetic sensors to handheld quantum communication links. Furthermore, the devices (e.g., FIG. 12) can be fiber coupled and packaged to serve as a robust demonstration and learning tool for teaching and public outreach. For example, the device 1200 shown in FIG. 12, can serve as a random number generator based on photon arrival times in one of the two output arms. Alternatively, by swapping the DC current with an AC microwave source, the spin can be coherently controlled and measured using off-chip electronics. In either case, the chip-scale device replaces the function of a laboratory-scale, delicate optical setup, and paves the way for the realization of more complex circuits containing multiple emitters and optical switching networks.

Although the method is illustrated and described herein with reference to specific embodiments, it is not intended to be limited to the details shown. Rather, various modifications may be made in the details within the scope and range of equivalents of the claims.

What is claimed:

1. A method for fabricating an optical component, comprising:

forming, on a substrate having a base and a fin extending from the base, a buffer layer leaving a portion of the fin exposed and having sides and a top, each of which extends above the buffer layer, the substrate having a first refractive index and the buffer material having a second refractive index; and depositing a confinement layer over the buffer layer and directly on the sides and the top of the portion of the fin that extends above the buffer layer to form an optical waveguide, the confinement layer having a third refractive index;

wherein the first refractive index is greater than the third refractive index, and the third refractive index is greater than the second refractive index.

2. The method of claim 1, wherein;
the substrate is diamond, silicon or silicon carbide, the buffer layer is silicon dioxide, and the confinement layer is silicon nitride.

3. The method of claim 1, further comprising:
fabricating electronic circuitry and photonic integrated circuit devices on the substrate and connecting the electronic circuitry via the optical waveguide.

4. An optical component, comprising:
a substrate having a base and a fin extending from the base, the substrate having a first refractive index;
a buffer layer formed on the substrate leaving a portion of the fin exposed and having sides and a top, each of which extends above the buffer layer, the buffer layer having a second refractive index; and
a confinement layer deposited over the buffer layer and directly on the sides and the top of the portion of the fin that extends above the buffer layer, the confinement layer having a third refractive index;
wherein the first refractive index is greater than the third refractive index, and the third refractive index is greater than the second refractive index.

5. The optical component of claim 4, wherein;
the substrate is diamond, silicon or silicon carbide, the buffer layer is silicon dioxide, and the confinement layer is silicon nitride.

6. The optical component of claim 4, further comprising:
electronic circuitry and photonic integrated circuit devices fabricated on the substrate and connected via the optical waveguide.

* * * * *